(12) United States Patent
Honma (10) Patent No.: US 7,546,911 B2
(45) Date of Patent: Jun. 16, 2009

(54) SUSPENSION APPARATUS

(75) Inventor: Motohiko Honma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 162 days.

(21) Appl. No.: 11/211,753

(22) Filed: Aug. 26, 2005

(65) Prior Publication Data

US 2006/0060438 A1    Mar. 23, 2006

(30) Foreign Application Priority Data

Sep. 21, 2004   (JP)   ............... 2004-273398

(51) Int. Cl.
*F16F 9/00*   (2006.01)
(52) U.S. Cl. .................. 188/266.2; 188/314; 280/5.502
(58) Field of Classification Search ............. 188/266.1, 188/266.2, 314; 280/5.506, 5.507, 5.508, 280/5.509
See application file for complete search history.

(56) References Cited

U.S. PATENT DOCUMENTS

| | | | |
|---|---|---|---|
| 4,693,493 A | | 9/1987 | Ikemoto et al. |
| 4,958,850 A | * | 9/1990 | Buma et al. .............. 280/6.157 |
| 5,013,061 A | * | 5/1991 | Fujimura et al. ......... 280/5.502 |
| 5,188,390 A | * | 2/1993 | Clark ....................... 280/5.501 |
| 6,145,859 A | * | 11/2000 | Altherr et al. ......... 280/124.159 |
| 7,055,831 B2 | * | 6/2006 | Brandenburger ......... 280/5.504 |

FOREIGN PATENT DOCUMENTS

| | | |
|---|---|---|
| FR | 2 436 030 | 4/1980 |
| JP | U 59-177842 | 11/1984 |
| JP | A 61-021814 | 1/1986 |
| JP | A 63-049512 | 3/1988 |
| JP | A 63-078806 | 4/1988 |
| JP | A 63-130419 | 6/1988 |
| JP | A-04-126620 | 4/1992 |
| JP | A-07-081367 | 3/1995 |

* cited by examiner

*Primary Examiner*—Bradley T King
(74) *Attorney, Agent, or Firm*—Oliff & Berridge, PC (57) ABSTRACT

A suspension apparatus for use in a vehicle including a first liquid passage; a first connection portion; a first accumulator which is connected to the hydraulic suspension device via the first connection portion and the first liquid passage; a second liquid passage; a second connection portion; a second accumulator which is connected to the first liquid passage via the second connection portion and the second liquid passage; and a liquid-flow control device which controls a flow of a hydraulic liquid between the hydraulic suspension device and at least one of the first and second accumulators, wherein the first liquid passage and the first connection portion allow the hydraulic liquid to more easily flow therethrough into the first accumulator than the second liquid passage and the second connection portion allow the hydraulic liquid to flow therethrough into the second accumulator.

7 Claims, 5 Drawing Sheets

SUSPENSION APPARATUS

The present application is based on Japanese Patent Application No. 2004-273398 filed on Sep. 21, 2004, the contents of which are incorporated herein by reference.

BACKGROUND OF THE INVENTION

1. Field of the Invention

The present invention relates to a suspension apparatus including a hydraulic suspension device (e.g., a so-called "hydraulic suspension cylinder") and at least two accumulators which are connected to the suspension device.

2. Discussion of Related Art

Each of Patent Document 1 (Japanese Patent Application Publication No. 63-130419), Patent Document 2 (Japanese Patent Application Publication No. 63-78806), and Patent Document 3 (Japanese Patent Application Publication No. 63-49512) discloses a suspension apparatus including a hydraulic suspension cylinder provided for a wheel of a vehicle, two accumulators connected to the suspension cylinder, and a switchable valve provided between the two accumulators.

When, in the above-indicated suspension apparatus, the switchable valve is switched between a closed state thereof and an open state thereof, the number of the accumulator(s) that communicates or communicate with the suspension cylinder is changed, and accordingly a spring constant of the two accumulators as a whole is changed between a high value and a low value.

SUMMARY OF THE INVENTION

It is therefore an object of the present invention to provide a suspension apparatus which includes a hydraulic suspension device and at least two accumulators and which prevents a system hydraulic pressure from being excessively increased.

Hereinafter, some examples of various modes of the present invention that are recognized as being claimable in the present application (hereinafter, referred to as the claimable modes, where appropriate) will be described and explained. The claimable modes include at least respective modes corresponding to the appended claims, but may additionally include broader or narrower modes of the present invention, or even one or more different inventions than the present invention. Each of the following modes (1) through (8) is numbered like the appended claims, and depends from the other mode or modes, where appropriate, so as to help understand the claimable modes and to indicate and clarify possible combinations of elements or technical features thereof. It is, however, to be understood that the present invention is not limited to the elements or technical features of the following modes, or the combinations thereof, that will be described below for illustrative purposes only. It is to be further understood that each of the following modes should be construed in view of not only the explanations directly associated therewith and but also the detailed description of the preferred embodiments of the invention, and that in additional claimable modes, one or more elements or one or more technical features may be added to, or deleted from, any of the following specific modes.

(1) A suspension apparatus for use in a vehicle including a body, a body-side member, a wheel, and a wheel-side member, the apparatus comprising a hydraulic suspension device which is adapted to be provided between the body-side member and the wheel-side member; a first liquid passage; a first connection portion; a first accumulator which is connected to the first liquid passage via the first connection portion and is connected to the hydraulic suspension device via the first connection portion and the first liquid passage; a second liquid passage; a second connection portion; a second accumulator which is connected to the second liquid passage via the second connection portion and is connected to the first liquid passage via the second connection portion and the second liquid passage; and a liquid-flow control device which controls a flow of a hydraulic liquid between the hydraulic suspension device and at least one of the first and second accumulators, wherein in a state in which the liquid-flow control device allows the hydraulic liquid to flow from the hydraulic suspension device into each of the first and second accumulators, the first liquid passage and the first connection portion allow the hydraulic liquid to more easily flow therethrough into the first accumulator than the second liquid passage and the second connection portion allow the hydraulic liquid to flow therethrough into the second accumulator. The hydraulic suspension device may be a so-called "hydraulic suspension cylinder".

In the present suspension apparatus, at least two hydraulic accumulators including the first and second accumulators are connected, in parallel, to the hydraulic suspension device. More specifically described, the first accumulator is connected to the suspension device via the first liquid passage, and the second accumulator is connected to the suspension device via the second liquid passage. In the case where the preset suspension apparatus employs three or more hydraulic accumulators, the present invention is applicable to two hydraulic accumulators out of the three or more hydraulic accumulators.

The liquid-flow control device controls the flow of the hydraulic liquid between the hydraulic suspension device and the first and/or second accumulators. For example, the liquid-flow control device is selectively operable in a first mode thereof in which the control device allows the hydraulic liquid to flow between the hydraulic suspension device and each of the first and second accumulators, and a second mode thereof in which the control valve allows the hydraulic liquid to flow between the hydraulic suspension device and the second accumulator and inhibits the hydraulic liquid from flowing between the hydraulic suspension device and the first accumulator. The liquid-flow control device will be described later.

In the state in which the present suspension apparatus allows the hydraulic liquid to flow from the hydraulic suspension device into each of the first and second accumulators, the first liquid passage and the first connection portion allow the hydraulic liquid to more easily flow therethrough into the first accumulator than the second liquid passage and the second connection portion allow the hydraulic liquid to flow therethrough into the second accumulator.

In other words, the first liquid passage and the first connection portion have a lower resistance to the flow of the hydraulic liquid therethrough than that of the second liquid passage and the second connection portion. In the case where a common portion of the first liquid passage that is commonly used to send the hydraulic liquid to the first and second accumulators, has a substantial flow resistance, the common portion should be added to the second liquid passage, or should be subtracted from the first liquid passage. For example, the shapes or dimensions of the first liquid passage and the first connection portion are so determined as to have the lower flow resistance than the flow resistance the shapes or dimensions of the second liquid passage and the second connection portion are so determined as to have. More specifically described, a transverse cross-section area of each of the first liquid passage and the first connection portion may be larger than that of each of the second liquid passage and the second connection portion, or the first liquid passage may be is shorter than the second liquid passage.

At any rate, in the state in which the hydraulic liquid is allowed to flow from the hydraulic suspension device into each of the first and second accumulators, the hydraulic liquid can more easily flow into the first accumulator than into the second accumulator. That is, when a certain amount of the hydraulic liquid flows out of the hydraulic suspension device, a greater amount of the hydraulic liquid flows into the first accumulator and a smaller amount of the hydraulic liquid flows into the second accumulator, as compared with a case where the hydraulic liquid can flow, with a same degree of ease, into the first and second accumulators. Thus, the pressure in the second accumulator can be prevented from being excessively increased.

Since the greater amount of the hydraulic liquid flows into the first accumulator, the pressure in the first accumulator is increased by a greater amount; and since the smaller amount of the hydraulic liquid flows into the second accumulator, the pressure in the second accumulator is increased by a smaller amount. In a particular case where the second accumulator has a spring constant higher than that of the first accumulator, the pressure in the first accumulator is increased by an off-set or restrained amount and similarly the pressure in the second accumulator is increased by an off-set or restrained amount. Therefore, the hydraulic pressure in the present suspension apparatus, i.e., in the first and second liquid passages (this hydraulic pressure will be referred to as the "system pressure" where appropriate) can be effectively prevented from being excessively increased, and accordingly the suspension apparatus can be avoided from being subjected to an excessively great force.

(2) The suspension apparatus according to the mode (1), wherein the first accumulator accommodates a first elastic body whose elastic deformation allows the hydraulic liquid to flow thereinto, and the second accumulator accommodates a second elastic body whose elastic deformation allows the hydraulic liquid to flow thereinto, and wherein the second elastic body has a spring constant higher than a spring constant of the first elastic body.

The second elastic body has the higher spring constant than that of the first elastic body. For example, in the case where each of the first and second elastic body is provided by a mass of pressurized gas such as high-pressure air, a volume of the second elastic body is smaller than that of the first elastic body.

(3) The suspension apparatus according to the mode (1) or (2), wherein each of the first and second accumulators includes a housing; and a partition member which separates an inner space of the housing into two portions one of which provides a hydraulic chamber filled with the hydraulic liquid and an other of which accommodates an elastic body elastically pressing, via the partition member, the hydraulic liquid filling the hydraulic chamber.

In each of the first and second accumulators, the partition member may be provided by a flexible member such as bellows, a diaphragm, or a bladder; or a piston. In a particular case where the partition member is provided by a piston, the elastic body may be provided by a spring.

In the case where the first or second elastic body is provided by a mass of pressurized gas, the spring constant of the first or second accumulator can be increased or decreased by decreasing or increasing a volume of the pressurized gas charged into the accumulator while a pressure of the gas is not changed; and in the case where the elastic body is provided by a spring, the spring constant of the first or second accumulator can be increased or decreased by increasing or decreasing a spring constant of the spring.

(4) The suspension apparatus according to any of the modes (1) through (3), wherein the first connection portion has a first transverse cross-section area, the second connection portion has a second transverse cross-section area, the first liquid passage has a third transverse cross-section area, and the second liquid passage has a fourth transverse cross-section area, and wherein at least one of the second and fourth transverse cross-section areas is smaller than each of the first and third transverse cross-section areas.

For example, a transverse cross-section area of at least a portion of at least one of the second liquid passage and the second connection portion is smaller than that of the first liquid passage and the first connection portion. That is, the second liquid passage or the second connection portion includes the portion having the smallest cross-section area in the second liquid passage, the second connection portion, the first liquid passage, and the first connection portion. In other words, one of the smaller one of the respective cross-section areas of the first liquid passage and the first connection portion is larger than the smaller one of the respective cross-section areas of the second liquid passage and the second connection portion. Consequently the hydraulic liquid can more easily flow into the first accumulator than into the second accumulator.

For example, it is preferred that the ratio, $S_{J1}/S_{J2}$, of the transverse cross-section area $S_{J1}$ of the first connection portion (smaller than the transverse cross-section area $S_{P1}$ of the first liquid passage) to the transverse cross-section area $S_{J2}$ of the second connection portion (smaller than the transverse cross-section area $S_{P2}$ of the second liquid passage) be not smaller than 2 or not smaller than 3, more preferably, not smaller than 4, not smaller than 6, or not smaller than 10, on one hand, and not greater than 36, not greater than 30, or not greater than 20. If this ratio is too great, i.e., the transverse cross-section area $S_{J2}$ of the second connection portion is too small, then the ratio of the amount of the hydraulic liquid flowing into the second accumulator to the amount of the liquid flowing into the first accumulator would be too small.

(5) The suspension apparatus according to any of the modes (1) through (4), wherein the liquid-flow control device includes at least one control valve which is provided between the first accumulator and a third connection portion where the second liquid passage is connected to the first liquid passage, and which is selectively switchable to (a) a communication state thereof in which said at least one control valve causes the hydraulic suspension device to communicate with the first accumulator and thereby allows the hydraulic liquid to flow from the hydraulic suspension device to the first accumulator and flow from the first accumulator to the hydraulic suspension device, and (b) a conditional inhibition state thereof in which said at least one control valve inhibits, when a pressure difference obtained by subtracting, from a pressure of the hydraulic liquid in a first portion of the first liquid passage that is located between said at least one control valve and the hydraulic suspension device, a pressure of the hydraulic liquid in a second portion of the first liquid passage that is located between said at least one control valve and the first accumulator does not exceed a pre-set pressure, the hydraulic liquid from flowing between the hydraulic suspension device and the first accumulator and, when the pressure difference exceeds the pre-set pressure, allows the hydraulic liquid to flow from the hydraulic suspension device to the first accumulator and inhibits the hydraulic liquid from flowing from the first accumulator to the hydraulic suspension device.

In the state in which the hydraulic liquid is allowed to flow between the hydraulic suspension device and the second accumulator, if the liquid-flow control device allows the hydraulic liquid to flow between the hydraulic suspension device and the first accumulator, then the hydraulic liquid is allowed to flow between the hydraulic suspension device and each of the first and second accumulators. Therefore, when the hydraulic suspension device is operated, the hydraulic liquid flows between the hydraulic suspension device and each of the first and second accumulators. Since the hydraulic suspension device communicates with each of the first and second accumulators, a spring constant of the two accumulators as a whole is low, which contributes to improving the riding comfort of the driver on the vehicle.

If the pressure difference obtained by subtracting, from the hydraulic pressure in the first portion of the first liquid passage that is located on the side of the hydraulic suspension device, the hydraulic pressure in the second portion of the first liquid passage that is located on the side of the first accumulator is smaller than the pre-set pressure (e.g., a biasing pressure produced by a spring), the hydraulic liquid is inhibited from flowing between the hydraulic suspension device and the first accumulator, while the hydraulic liquid is allowed to flow between the hydraulic suspension device and the second accumulator. Since the hydraulic suspension device communicates with the second accumulator only, the spring constant of the two accumulators as a whole is, in fact, equal to a spring constant of the second accumulator and accordingly is high. Therefore, when a load that is applied to the hydraulic suspension device in a vertical direction changes by a certain amount, an amount of operation of the hydraulic suspension device (e.g., a stroke of a piston rod of the so-called hydraulic suspension cylinder) is small and accordingly an amount of relative displacement of the body-side member and the wheel-side member in the vertical direction can be small.

When the above-indicated pressure difference exceeds the pre-set pressure, the hydraulic liquid is allowed to flow from the hydraulic suspension device to the first accumulator but is inhibited from flowing from the first accumulator to the hydraulic suspension device. Thus, the hydraulic liquid is allowed to flow from the hydraulic suspension device into each of the first and second accumulators. Since the hydraulic liquid can more easily flow into the first accumulator than into the second accumulator, a greater amount of the hydraulic liquid flows into the first accumulator and a smaller amount of the liquid flows into the second accumulator, as compared with the case where the hydraulic liquid can flow, with the same degree of ease, into each of the first and second accumulators. In a particular case where the spring constant of the second accumulator is higher than that of the first accumulator, the system pressure of the present suspension apparatus can be effectively prevented from being excessively increased.

(6) The suspension apparatus according to any of the modes (1) through (5), wherein the liquid-flow control device comprises (a) a solenoid-operated valve which is provided in the first liquid passage and includes a solenoid and which is selectively switchable to at least an open state thereof and a closed state thereof, when an electric current supplied to the solenoid is controlled, and (b) a relief valve which is provided in parallel with the solenoid-operated valve and which inhibits, when a pressure difference obtained by subtracting, from a pressure of the hydraulic liquid in a first portion of the first liquid passage that is located between the relief value and the hydraulic suspension device, a pressure of the hydraulic liquid in a second portion of the first liquid passage that is located between the relief valve and the first accumulator does not exceed a pre-set pressure, the hydraulic liquid from flowing between the hydraulic suspension device and the first accumulator and, when the pressure difference exceeds the pre-set pressure, allows the hydraulic liquid to flow from the hydraulic suspension device to the first accumulator and inhibits the hydraulic liquid from flowing from the first accumulator to the hydraulic suspension device.

Even in the state in which the solenoid-operated valve is closed, when the above-indicated pressure difference exceeds the pre-set value, the relief valve is switched from its closed state to its open state, so that the hydraulic liquid is allowed to flow from the hydraulic suspension device to the first accumulator.

The solenoid-operated valve may be adapted such that when a great inertia force is applied to the vehicle, e.g., when a transverse-direction (i.e., lateral) acceleration or a longitudinal-direction acceleration of the vehicle is higher than a threshold value, the valve is switched from its open state to its closed state.

(7) The suspension apparatus according to any of the modes (1) through (6), wherein each of the first and second accumulators includes a housing; and a partition member which separates an inner space of the housing into two chambers one of which is located on a side of a corresponding one of the first and second liquid passages and provides a hydraulic chamber filled with the hydraulic liquid and an other of which is located opposite to the hydraulic chamber and provides a spring chamber elastically pressing, via the partition member, the hydraulic liquid filling the hydraulic chamber.

In the present suspension apparatus, each of the first and second accumulators functions as a pressure-change absorbing device.

(8) A suspension apparatus for use in a vehicle including a body, a body-side member, a wheel, and a wheel-side member, the apparatus comprising a hydraulic suspension device which is adapted to be provided between the body-side member and the wheel-side member; a first accumulator and a second accumulator which are connected, in parallel, to the hydraulic suspension device via a first liquid passage and a second liquid passage, respectively; and a liquid-flow control device which is provided in the first liquid passage and which controls a flow of a hydraulic liquid between the hydraulic suspension device and at least the first accumulator, wherein the first accumulator accommodates a first elastic body whose elastic deformation allows the hydraulic liquid to flow thereinto, the second accumulator accommodates a second elastic body whose elastic deformation allows the hydraulic liquid to flow thereinto, and the second elastic body has a spring constant higher than a spring constant of the first elastic body, and wherein the liquid-flow control device is selectively operable in (a) a low spring constant mode thereof in which the liquid-flow control device allows the hydraulic liquid to flow from the hydraulic suspension device to each of the first and second accumulators and flow from said each accumulator to the hydraulic suspension device, (b) a high spring constant mode thereof in which the liquid-flow control device allows the hydraulic liquid to flow from the hydraulic suspension device to the second accumulator and flow from the second accumulator to the hydraulic suspension device, and inhibits the hydraulic liquid from flowing between the hydraulic suspension device and the first accumulator, and (c) a relief mode thereof in which the liquid-flow control device allows the hydraulic liquid to flow from the hydraulic suspension device to the second accumulator and flow from the second accumulator to the hydraulic suspension device, and inhibits, when a pressure difference obtained by subtracting, from a pressure of the hydraulic liquid in a first portion of the first liquid passage that is located between the liquid-flow control device and the hydraulic suspension device, a pressure of the hydraulic liquid in a second portion of the first liquid passage that is located between the liquid-flow control device and the first accumulator does not exceed a pre-set pressure, the hydraulic liquid from flowing between the hydraulic suspension device and the first accumulator and, when the pressure difference exceeds the pre-set pressure, allows the hydraulic liquid to flow from the hydraulic suspension device to the first accumulator and inhibits the hydraulic liquid from flowing from the first accumulator to the hydraulic suspension device.

The present suspension apparatus may employ any of the technical features in accordance with the modes (1) through (7).

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described a suspension apparatus as an embodiment of the present invention by reference to the drawings. Though four suspension apparatuses each according to the invention are provided for four wheels (i.e., left and right front wheels and left and right rear wheels) of a vehicle, respectively, one of the four suspension apparatuses that is provided for, e.g., the left front wheel will be described as a representative of the four apparatuses, and description of the other, three apparatuses is omitted.

Figure 1:
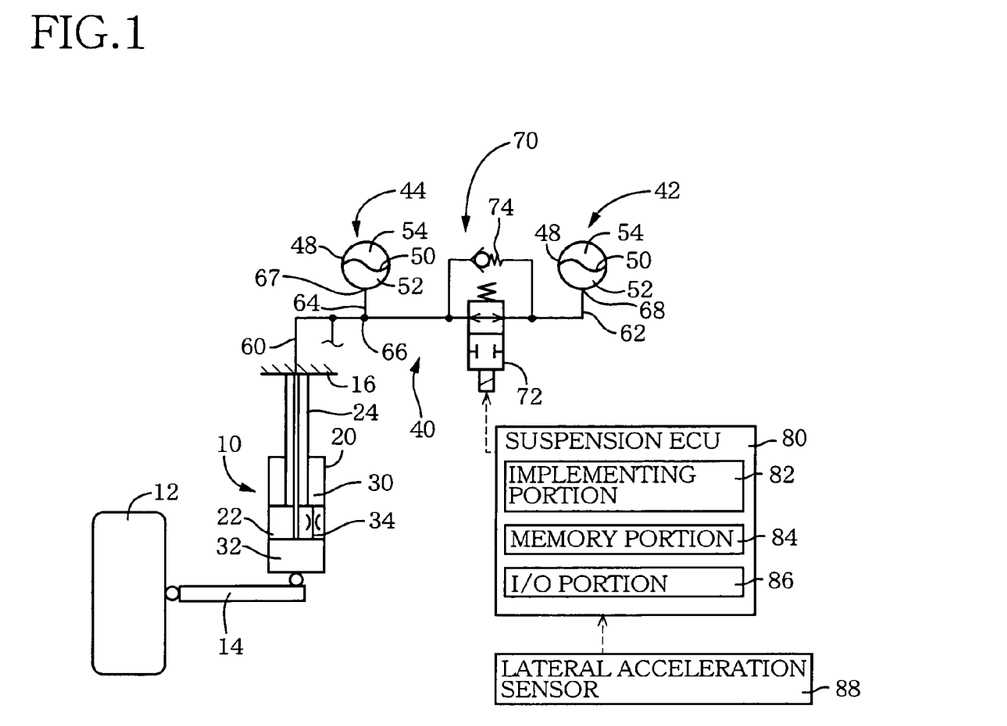
FIG. 1 is a schematic view of a relevant portion of a suspension apparatus as a first embodiment of the present invention.

In FIG. 1, reference numeral 10 designates a shock absorber as a hydraulic suspension device (so-called "hydraulic suspension cylinder") that is provided, for a left front wheel 12 of an automotive vehicle, between a wheel-side member 14 and a body-side member 16. The wheel-side member 14 is provided on the side of the left front wheel 12, and the body-side member 16 is provided on the side of a body of the vehicle. The shock absorber 10 includes a cylindrical housing 20, a piston 22 that is slideably received in the housing 20, and a piston rod 24 that is connected, at one of opposite ends thereof, to the piston 24. In the present embodiment, the housing 20 is connected to the wheel-side member 14 such that the housing 20 is not movable relative to the same 14 in an upward or a downward direction; and the piston rod 24 is connected, at the other end thereof, to the body-side member 16 such that the piston rod 24 is not movable relative to the same 16 in the upward or downward direction.

In the shock absorber 10, an inner space of the housing 20 is separated by the piston 22 into two hydraulic chambers 30, 32, and the piston 22 has a communication passage 34 as a restrictor passage that includes a restrictive portion and connects between the two hydraulic chambers 30, 32. When one of the wheel-side member 14 and the body-side member 16 is moved relative to the other in the upward or downward direction, a corresponding one of the housing 20 and the piston 22 is moved relative to the other in the same direction. Thus, the shock absorber 10 exhibits a damping effect corresponding to a speed of movement of the piston 22 relative to the housing 20. A damping-characteristic control actuator, not shown, changes a cross-section area of the communication passage 34, and thereby controls a damping characteristic of the shock absorber 10.

One 32 of the two hydraulic chambers 30, 32 of the shock absorber 10 is connected, in parallel, to a first and a second accumulator 42, 44 via a flow passage 40.

Figure 2:
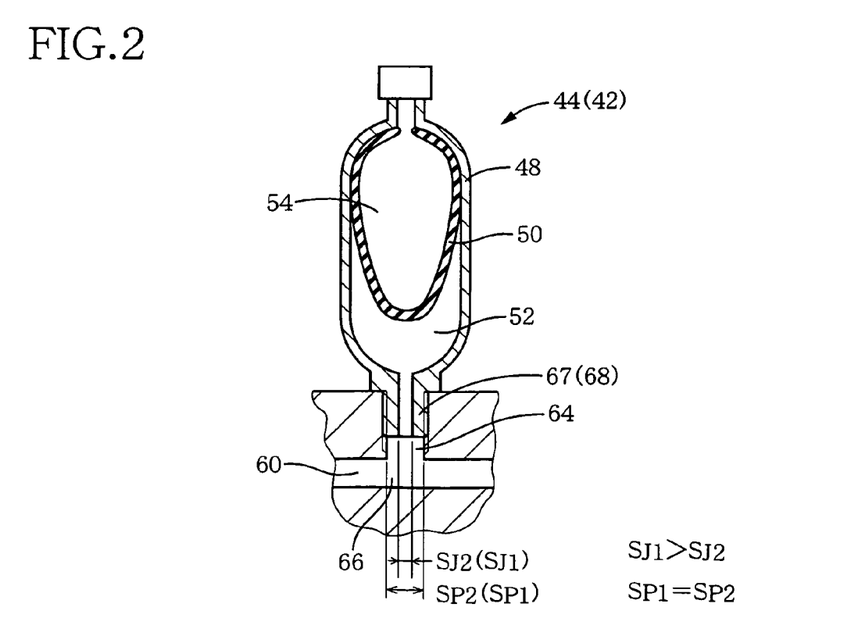
FIG. 2 is a schematic cross-section view of a representative one of a first and a second accumulator of the suspension apparatus.

As shown in FIG. 2, each of the first and second accumulators 42, 44 includes a housing 48, and a flexible partition member 50 that separates an inner space of the housing 48 into two chambers, i.e., a hydraulic chamber 52 located on the side of the flow passage 40, and a gas chamber 54 located opposite to the hydraulic chamber 52. The hydraulic chamber 52 is filled with a hydraulic liquid, and the gas chamber 54 accommodates a pressurized gas (e.g., a high-pressure air) functioning as an elastic body. A pressure of the liquid in the hydraulic chamber 52 and a pressure of the gas in the gas chamber 54 are kept equal to each other. When the hydraulic liquid flows into the hydraulic chamber 52, a volume of the hydraulic chamber 52 is increased and accordingly a volume of the gas chamber 54 is decreased, so that the gas pressure in the gas chamber 54 is increased and accordingly the liquid pressure in the hydraulic chamber 52 is increased. FIG. 2 shows a state in which the hydraulic chamber 52 is filled with a certain amount of the hydraulic liquid. In the present embodiment, the respective gas chambers 54 of the first and second accumulators 42, 44 are constructed such that when respective pressures of the respective pressurized gases filling the two gas chambers 54 are equal to each other, a volume of the gas filling the gas chamber 54 of the second accumulator 44, i.e., a volume of the gas chamber 54 of the second accumulator 44 is smaller than that of the gas chamber 54 of the first accumulator 42. Therefore, the second accumulator 44 has a higher spring constant than that of the first accumulator 42.

Thus, when a same amount of the hydraulic liquid flows into each of the first and second accumulators 42, 44, the pressure of the gas filling the gas chamber 54 of the second accumulator 44 is increased by a greater amount than that of the gas filling the gas chamber 54 of the first accumulator 42. In addition, when an external force applied to the wheel-side member 14 or the body-side member 16 in the upward or downward direction is changed by a certain amount, a smaller amount of the hydraulic liquid flows into the second accumulator 44 than an amount of the hydraulic liquid that flows into the first accumulator 42. Thus, the second accumulator 44 that has the higher spring constant than that of the first accumulator 42 can more effectively restrain the displacement of one of the wheel-side member 14 and the body-side member 16 relative to the other in the upward or downward direction.

The flow passage 40 includes a common passage 60, and a first and a second individual passage 62, 64 that are connected to the first and second accumulators 42, 44, respectively. In other words, the shock absorber 10 and the first accumulator 42 are connected to each other by the common passage 60 and the first individual passage 62; and the shock absorber 10 and the second accumulator 44 are connected to each other by the common passage 60 and the second individual passage 64. Thus, the common passage 60 and the first individual passage 62 cooperate with each other to provide a first liquid passage, and the second individual passage 64 provides a second liquid passage. The second individual passage 64 is connected to a connection point or portion 66 of the first liquid passage 60, 62.

A liquid-flow control device 70 is provided in the first individual passage 62. The liquid flow control device 70 includes a solenoid-operated open/close valve 72 and a relief valve 74 which are connected, in parallel, to the first individual passage 62. The solenoid-operated open/close valve 72 includes a solenoid, and is a normally open valve that is normally in an open state thereof and is switchable between the open state and a closed state thereof by controlling an electric current supplied to the solenoid. The relief valve 74 is switched from a closed state thereof to an open state thereof when a pressure difference obtained by subtracting, from the pressure of the hydraulic liquid in a first portion of the first individual passage 62 that is located on the side of the shock absorber 10, the pressure of the hydraulic liquid in a second portion of the first individual passage 62 that is located on the side of the first accumulator 42, exceeds a pre-set liquid pressure (hereinafter, referred to as the "relief pressure").

In the present embodiment, a flow passage in a connection portion (hereinafter, referred to as the "first connection portion") 68 of the first accumulator 42 that is connected to the first individual passage 62 has a transverse cross-section area $S_{J1}$ (hereinafter, referred to as the "first flow area $S_{J1}$"), and a flow passage in a connection portion (hereinafter, referred to as the "second connection portion") 67 of the second accumulator 44 that is connected to the second individual passage 64 has a transverse cross-section area $S_{J2}$ (hereinafter, referred to as the "second flow area $S_{J2}$") that is smaller than the first flow area $S_{J1}$. Meanwhile, the first individual passage 62 has a transverse cross-section area, i.e., a third flow area $S_{P1}$, and the second individual passage 64 has a transverse cross-section area, i.e., a fourth flow area $S_{P2}$ that is equal to the third flow area $S_{P1}$ and is larger than the first and second flow areas $S_{J1}$, $S_{J2}$. Therefore, a combination of the first individual passage 62 and the first connection portion 68 has a larger flow area than that of a combination of the second individual passage 64 and the second connection portion 67.

The present suspension apparatus additionally employs a suspension ECU (electronic control unit) 80 that is essentially constituted by a computer and includes an implementing portion 84, a memory portion 84, and an input/output (I/O) portion 86. To the I/O portion 86, the solenoid of the solenoid-operated open/close valve 72, and a lateral-acceleration sensor 88 that detects an acceleration of the vehicle in a lateral direction thereof are connected. The memory portion 84 stores a valve control program represented by a flow chart shown in FIG. 3.

Figure 3:
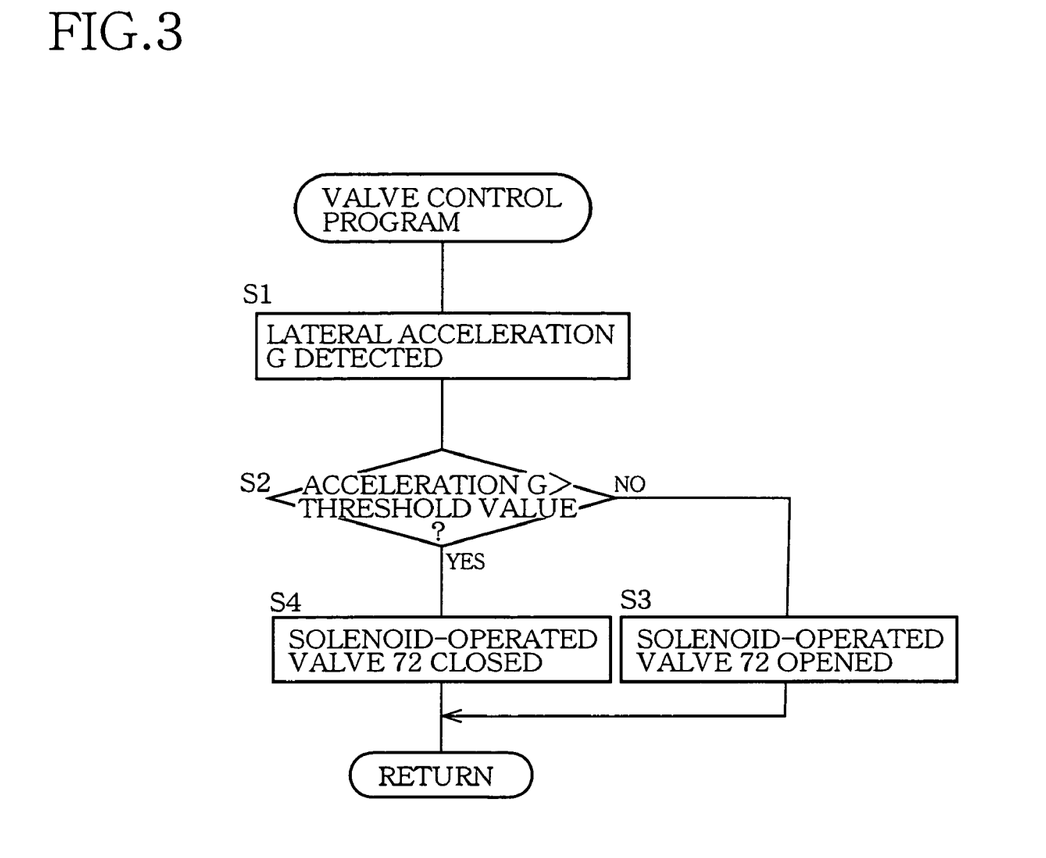
FIG. 3 is a flow chart representing a valve control program that is stored in a memory portion of a suspension ECU (electronic control unit) of the suspension apparatus.

The valve control program shown in FIG. 3 is periodically implemented at a pre-set interval of time. First, at Step S1, the suspension ECU 80 obtains the lateral acceleration of the vehicle, detected by the lateral-acceleration sensor 88. Subsequently, at Step S2, the ECU 80 judges whether the obtained lateral acceleration is higher than a threshold value. If a negative judgment is made at Step S2, the control of the ECU 80 goes to Step S3 to switch the solenoid-operated open/close valve 72 to the open state thereof; and, if a positive judgment is made at Step S2, the control of the ECU 80 goes to Step S4 to switch the open/close valve 72 to the closed state thereof.

Figure 4A:
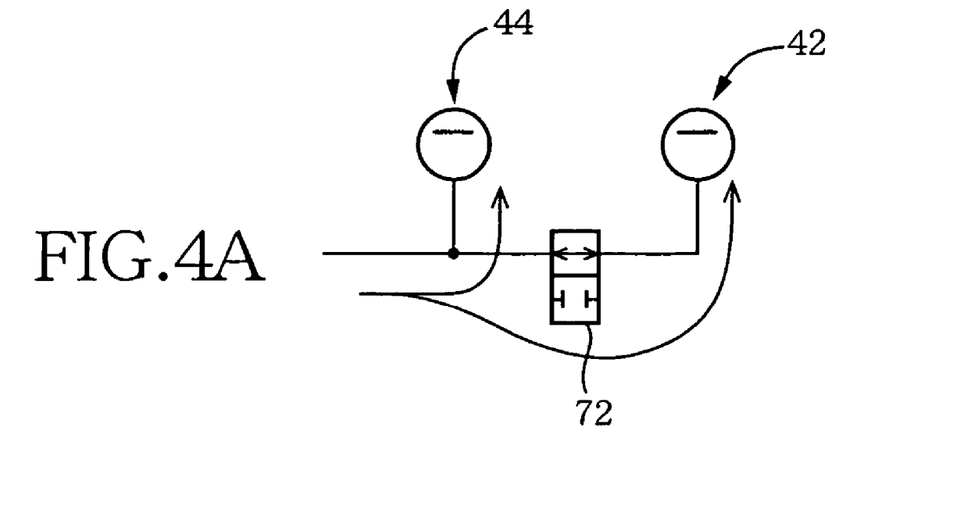
FIGS. 4A, 4B, and 4C are views for explaining respective different operating states of the suspension apparatus.

When the solenoid-operated open/close valve 72 is in its open state, the shock absorber 10 is in communication with both the first and second accumulators 42, 44, as shown in FIG. 4A. In this state, the change of pressure of the first accumulator 42 (e.g., the change of pressure of the gas in the gas chamber 54 thereof) and the change of pressure of the second accumulator 44 are equal to each other. More specifically described, when one of the wheel-side member 14 and the body-side member 16 is displaced relative to the other in the upward or downward direction, the piston 22 of the shock absorber 10 is moved in the upward or downward direction, and accordingly the shock absorber 10 communicates respective amounts of the hydraulic liquid with the first and second accumulators 42, 44. In this state, the first and second accumulators 42, 44 as a whole exhibit a low spring constant, as indicated at broken line in FIG. 5. Thus, the present suspension apparatus can improve the riding comfort of a driver of the vehicle.

Figure 4B:
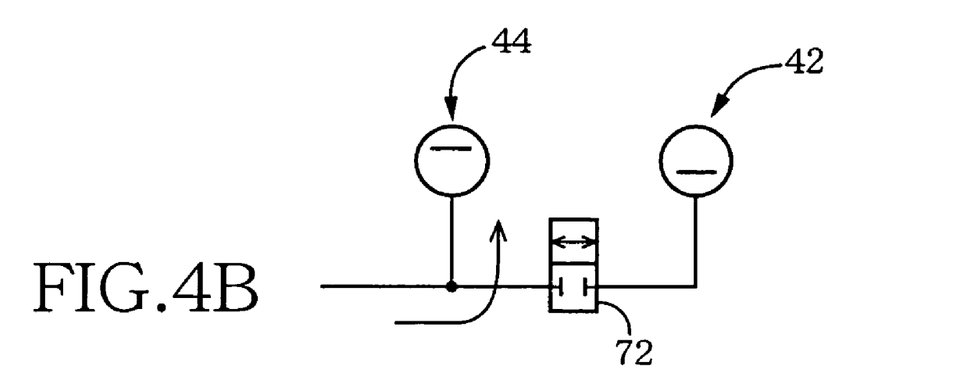
Figure 5:
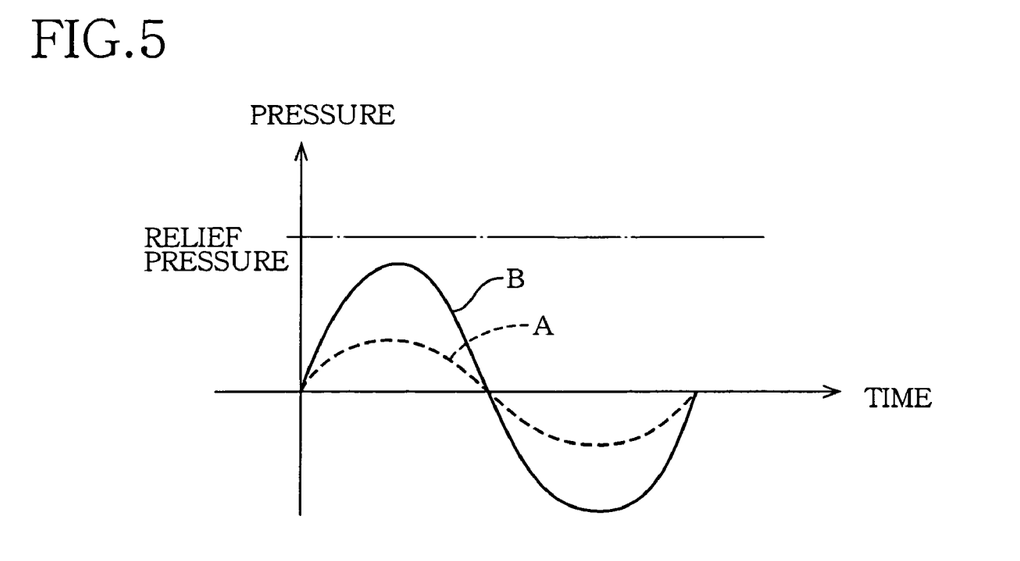
FIG. 5 is a graph showing different timewise changes of a system pressure in the suspension apparatus that correspond to the different operating states shown in FIGS. 4A and 5B, respectively.

On the other hand, when the open/close valve 72 is in its closed state, the shock absorber 10 cannot communicate with the first accumulator 42, and is in communication with the second accumulator 44 only, as shown in FIG. 4B. In this state, when the shock absorber 10 is operated, the shock absorber 10 communicates some amount of the hydraulic liquid with the second accumulator 44 only. In this state, the second accumulator 44 exhibits the higher spring constant than that of the two accumulators 42, 44 as a whole, as indicated at solid line in FIG. 5. As explained previously, the spring constant of the second accumulator 44 per se is higher than that of the first accumulator 42 per se. When a load applied to the wheel-side member 14 or the body-side member 16 is changed by a certain amount, a stroke of the piston rod 24 of the shock absorber 10 is smaller when the open/close valve 72 is in its closed state than when the valve 72 is in its open state. Thus, the present suspension apparatus can restrain the change of posture of the body of the vehicle that is caused by turning thereof. FIG. 5 shows a timewise change of the gas pressure in the respective gas chambers 54 of the first and second accumulators 42, 44 (corresponding to FIG. 4A), and a timewise change of the gas pressure in the gas chamber 54 of the second accumulator 44 (corresponding to FIG. 4B), under the condition that a system pressure (i.e., the pressure of the hydraulic liquid in the flow passage 40) does not exceed the above-described relief pressure.

Figure 4C:
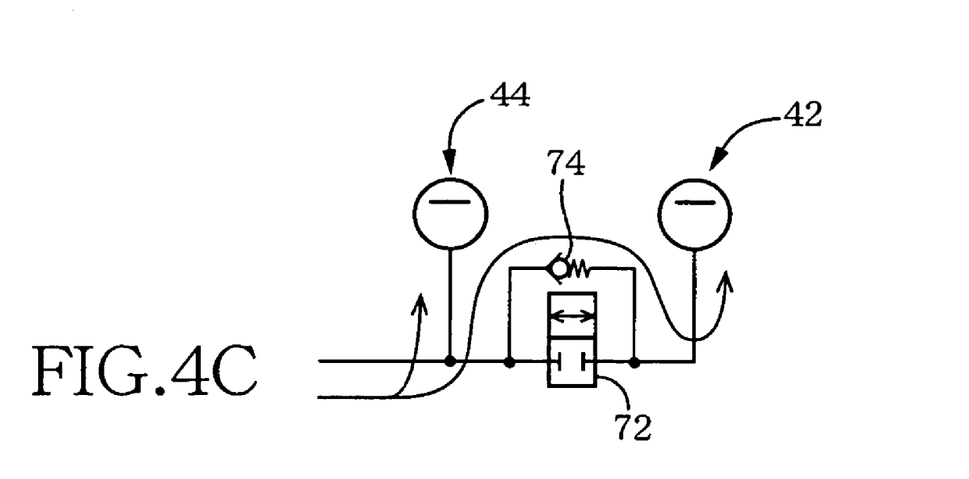

As the load applied to the wheel-side member 14 or the body-side member 16 in the upward or downward direction increases in the state in which the solenoid-operated open/close valve 72 is in its closed state, the liquid pressure in the hydraulic chamber 32 of the shock absorber 10 also increases. When the pressure difference across the relief valve 74 (the pressure difference is substantially equal to the system pressure, in this state) exceeds the relief pressure, the relief valve 74 is switched from its closed state to its open state. Thus, as shown in FIG. 4C, some amount of the hydraulic liquid is allowed to flow into the first accumulator 42 as well.

Figure 6A:
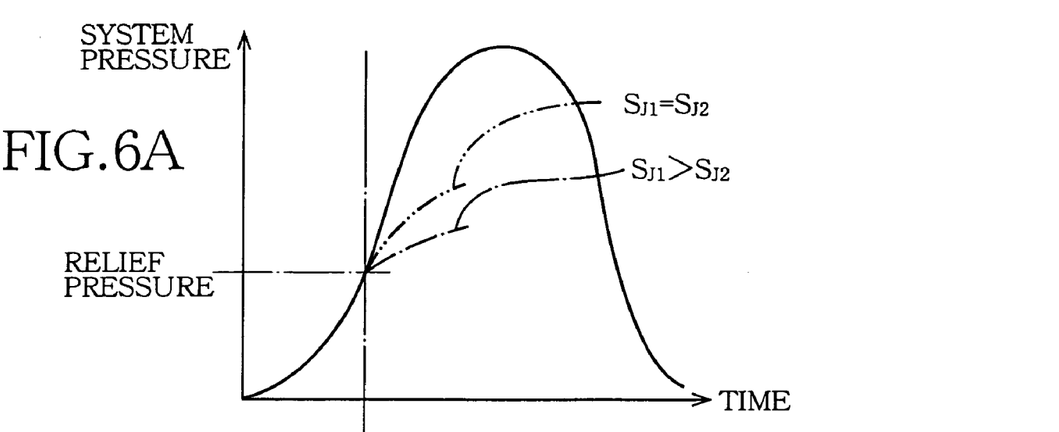
FIGS. 6A is a graph showing a timewise change of the system pressure in the suspension apparatus that corresponds to the operating state shown in FIG. 4C.
Figure 6B:
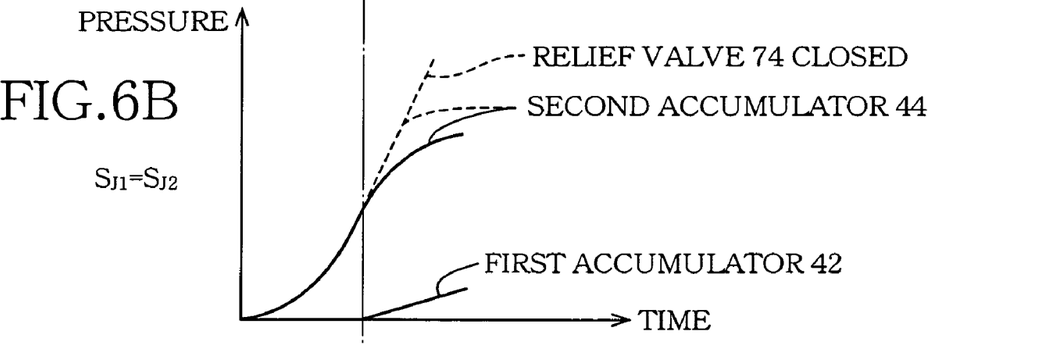
FIG. 6B is a graph showing respective timewise changes of respective pressures in the first and second accumulators in the case where a transverse cross-section area $S_{J1}$ of a first connection portion where the first accumulator is connected to a first liquid passage and a transverse cross-section area $S_{J2}$ of a second connection portion where the second accumulator is connected to a second liquid passage are equal to each other.
Figure 6C:
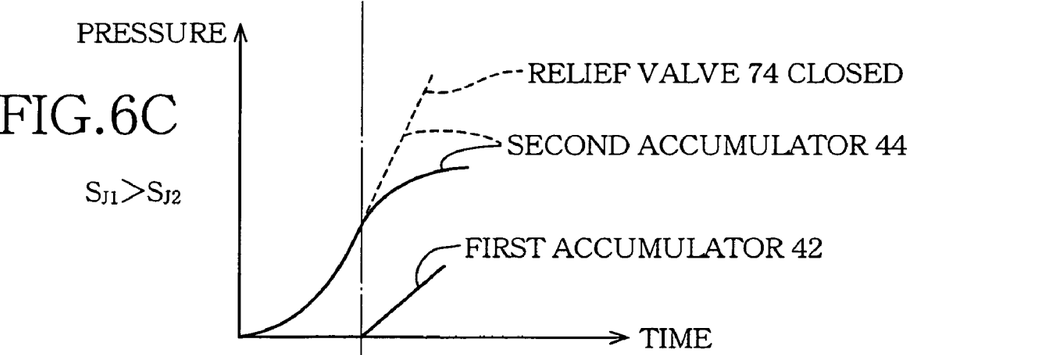
FIG. 6C is a graph showing respective timewise changes of the respective pressures in the first and second accumulators in the case where the transverse cross-section area $S_{J1}$ is larger than the transverse cross-section area $S_{J2}$.

Thus, as shown in FIG. 6B or 6C, the spring constant of the first and second accumulators 42, 44 as a whole is decreased, and accordingly a slope of increase of the pressure in the second accumulator 44 is decreased, as compared with the state, indicated at broken line, in which the relief valve 74 is in its closed state. Thus, the system pressure can be effectively prevented from being excessively increased, which leads to increasing the life expectancy of a piping system defining the flow passage 40 and the life expectancy of the present suspension apparatus as a whole.

In the present embodiment, since the flow area $S_{f1}$ of the first connection portion 68 is larger than the flow area $S_{f2}$ of the second connection portion 67, the hydraulic liquid can more easily flow into the first accumulator 42 than into the second accumulator 44. Therefore, as shown in FIGS. 6B and 6C, when a certain amount of the hydraulic liquid flows out of the shock absorber 10, the more amount of the liquid flows into the first accumulator 42 than into the second accumulator 44 and accordingly the slope of change, or the amount of increase, of the liquid pressure in the second accumulator 44 is smaller than that of the liquid pressure in the first accumulator 42. Therefore, as indicated at one-dot chain line and two-dot chain line in FIG. 6A, the system pressure can be effectively prevented from being excessively increased, by making it easier for the hydraulic liquid to flow into the first accumulator 42.

In the illustrated embodiment, since the flow area $S_{f1}$ of the first connection portion 68 is larger than the flow area $S_{f2}$ of the second connection portion 67, the hydraulic liquid can more easily flow into the first accumulator 42 than into the second accumulator 44. However, this effect can be obtained by making the first individual passage 62 shorter than the second individual passage 64.

In addition, in the illustrated embodiment, the solenoid-operated open/close valve 72 is opened and closed based on the lateral acceleration of the vehicle. However, the solenoid-operated open/close valve 72 may be adapted to be opened and closed based on an acceleration of the vehicle in a forward or a backward direction. If the stroke of the shock absorber 10 is restrained when the forward/backward acceleration of the vehicle is high, the pitching of the body of the vehicle can be reduced.

The liquid-flow control device 70 may be modified in various manners. For example, the solenoid-operated open/close valve 72 may be replaced with a solenoid-operated direction control valve. Alternatively, the solenoid-operated open/close valve 72 and the relief valve 74 may be integrated with each other.

Each of the first and second accumulators 42, 44 is not limited to the above-described bladder type. For example, each accumulator 42, 44 may be of a bellows type, a diaphragm type, or a piston type. The two accumulators 42, 44 may be of different types.

In each of the above-described embodiments, the shock absorber 10 is employed as the hydraulic suspension device. However, for example, an elastic-force producing device that produces an elastic force corresponding to an amount of displacement of one of the wheel-side member 14 and the body-side member 16 relative to the other in the upward or downward direction may be employed as the hydraulic suspension device.

It is to be understood that the present invention may be embodied with other changes and improvements, such as those described in SUMMARY OF THE INVENTION, that may occur to a person skilled in the art, without departing from the spirit and scope of the invention defined in the appended claims.

What is claimed is:

1. A suspension apparatus for use in a vehicle including a body, a body-side member, a wheel, and a wheel-side member, the apparatus comprising:

a hydraulic suspension device which is adapted to be provided between the body-side member and the wheel-side member;

a first liquid passage;

a first connection portion;

a first accumulator which is connected to the first liquid passage via the first connection portion and is connected to the hydraulic suspension device via the first connection portion and the first liquid passage;

a second liquid passage;

a second connection portion;

a second accumulator which is connected to the second liquid passage via the second connection portion and is connected to the first liquid passage via the second connection portion and the second liquid passage; and a liquid-flow control device which controls a flow of a hydraulic liquid between the hydraulic suspension device and at least one of the first and second accumulators, wherein in a state in which the liquid-flow control device allows the hydraulic liquid to flow from the hydraulic suspension device into each of the first and second accumulators, the first liquid passage and the first connection portion allow the hydraulic liquid to more easily flow therethrough into the first accumulator than the second liquid passage and the second connection portion allow the hydraulic liquid to flow therethrough into the second accumulator, wherein the first accumulator accommodates a first elastic body whose elastic deformation allows the hydraulic liquid to flow thereinto, and the second accumulator accommodates a second elastic body whose elastic deformation allows the hydraulic liquid to flow thereinto, and wherein the second elastic body has a spring constant higher than a spring constant of the first elastic body, wherein the liquid-flow control device comprises (a) a solenoid-operated valve which is provided in the first liquid passage and includes a solenoid and which is selectively switchable to at least an open state thereof and a closed state thereof, when an electric current supplied to the solenoid is controlled, and (b) a relief valve which is provided in parallel with the solenoid-operated valve and which inhibits, when a pressure difference obtained by subtracting, from a pressure of the hydraulic liquid in a first portion of the first liquid passage that is located between the relief valve and the hydraulic suspension device, a pressure of the hydraulic liquid in a second portion of the first liquid passage that is located between the relief valve and the first accumulator does not exceed a pre-set pressure, the hydraulic liquid from flowing between the hydraulic suspension device and the first accumulator and, when the pressure difference exceeds the pre-set pressure, allows the hydraulic liquid to flow from the hydraulic suspension device to the first accumulator and inhibits the hydraulic liquid from flowing from the first accumulator to the hydraulic suspension device, and wherein the suspension apparatus further comprises:

an acceleration sensor which detects an acceleration of the vehicle; and a valve control device which controls, based on the acceleration detected by the acceleration sensor, the electric current supplied to the solenoid of the solenoid-operated valve, so as to selectively switch the solenoid-operated valve to the open state thereof and the closed state thereof.

2. The suspension apparatus according to claim 1, wherein each of the first and second accumulators includes a housing; and a partition member which separates an inner space of the housing into two portions one of which provides a hydraulic chamber filled with the hydraulic liquid and an other of which accommodates a corresponding one of the first and second elastic bodies that elastically presses, via the partition member, the hydraulic liquid filling the hydraulic chamber.

3. The suspension apparatus according to claim 1, wherein the first connection portion has a first transverse cross-section area, the second connection portion has a second transverse cross-section area, the first liquid passage has a third transverse cross-section area, and the second liquid passage has a fourth transverse cross-section area, and wherein at least one of the second and fourth transverse cross-section areas is smaller than each of the first and third transverse cross-section areas.

4. The suspension apparatus according to claim 1, wherein the liquid-flow control device comprises the solenoid-operated valve and the relief valve is provided, in the first liquid passage, between the first accumulator and a third connection portion where the second liquid passage is connected to the first liquid passage.

5. The suspension apparatus according to claim 1, wherein each of the first and second accumulators includes a housing; and a partition member which separates an inner space of the housing into two chambers one of which is located on a side of a corresponding one of the first and second liquid passages and provides a hydraulic chamber filled with the hydraulic liquid and an other of which is located opposite to the hydraulic chamber and provides, as a corresponding one of the first and second elastic bodies, a spring chamber elastically pressing, via the partition member, the hydraulic liquid filling the hydraulic chamber.

6. The suspension apparatus according to claim 1, wherein the hydraulic suspension device includes a cylindrical housing which is adapted to be connected to one of the body-side member and the wheel-side member; a piston which separates an inner space of the housing into two hydraulic chambers each of which is filled with the hydraulic liquid and one of which communicates with the first liquid passage, wherein the piston has a restrictor passage which connects between the two hydraulic chambers; and a piston rod which is connected, at one of opposite ends thereof, to the piston and is adapted to be connected, at an other of the opposite ends thereof, to an other of the body-side member and the wheel-side member.

7. The suspension apparatus according to claim 1, wherein the acceleration sensor comprises a lateral-acceleration sensor which detects a lateral-direction acceleration of the vehicle, and wherein the valve control device controls, based on the lateral-direction acceleration detected by the lateral-acceleration sensor, the electric current supplied to the solenoid of the solenoid-operated valve, so as to selectively switch the solenoid-operated valve to the open state thereof and the closed state thereof.

* * * * *